March 13, 1951  F. H. JACKSON  2,544,685
TESTING DEVICE

Filed Feb. 20, 1946  2 Sheets-Sheet 2

INVENTOR
FRANK H. JACKSON
BY
ATTORNEY

Patented Mar. 13, 1951

2,544,685

UNITED STATES PATENT OFFICE 2,544,685

TESTING DEVICE

Frank H. Jackson, Rochester, N. Y., assignor, by mesne assignments, to the United States of America as represented by the Secretary of the Navy Application February 20, 1946, Serial No. 649,094

6 Claims. (Cl. 175—183)

The present invention relates generally to testing arrangements and more particularly to devices for measuring the time interval between the instant of application of an electromotive force to a circuit including a capacitor and the instant of attainment of a predetermined voltage across the capacitor.

It is an object of the invention to provide an improved, simple, accurate and efficient device for measuring the time of charge of a capacitor.

Figure 1:
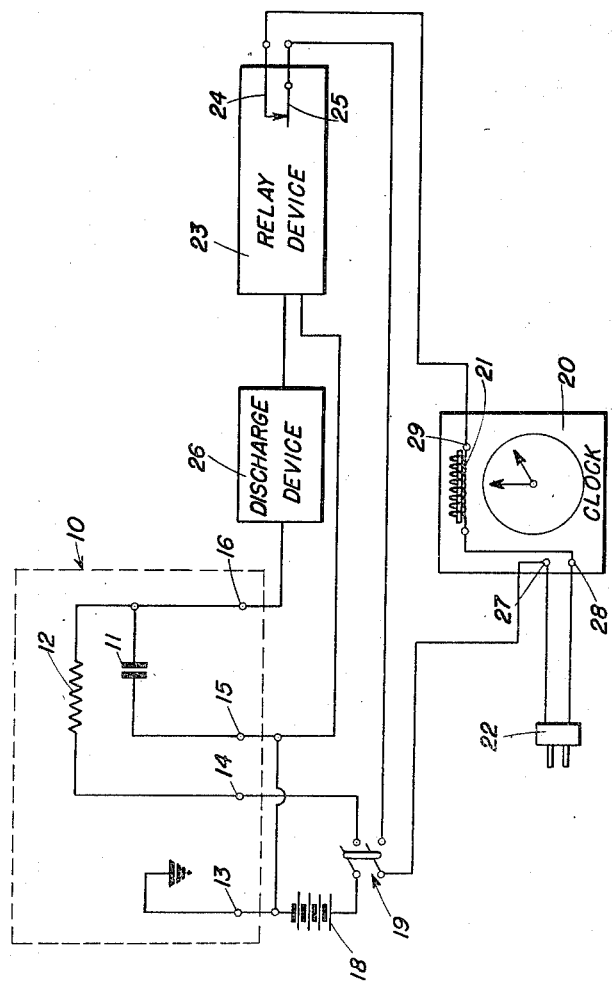
Figure 2:
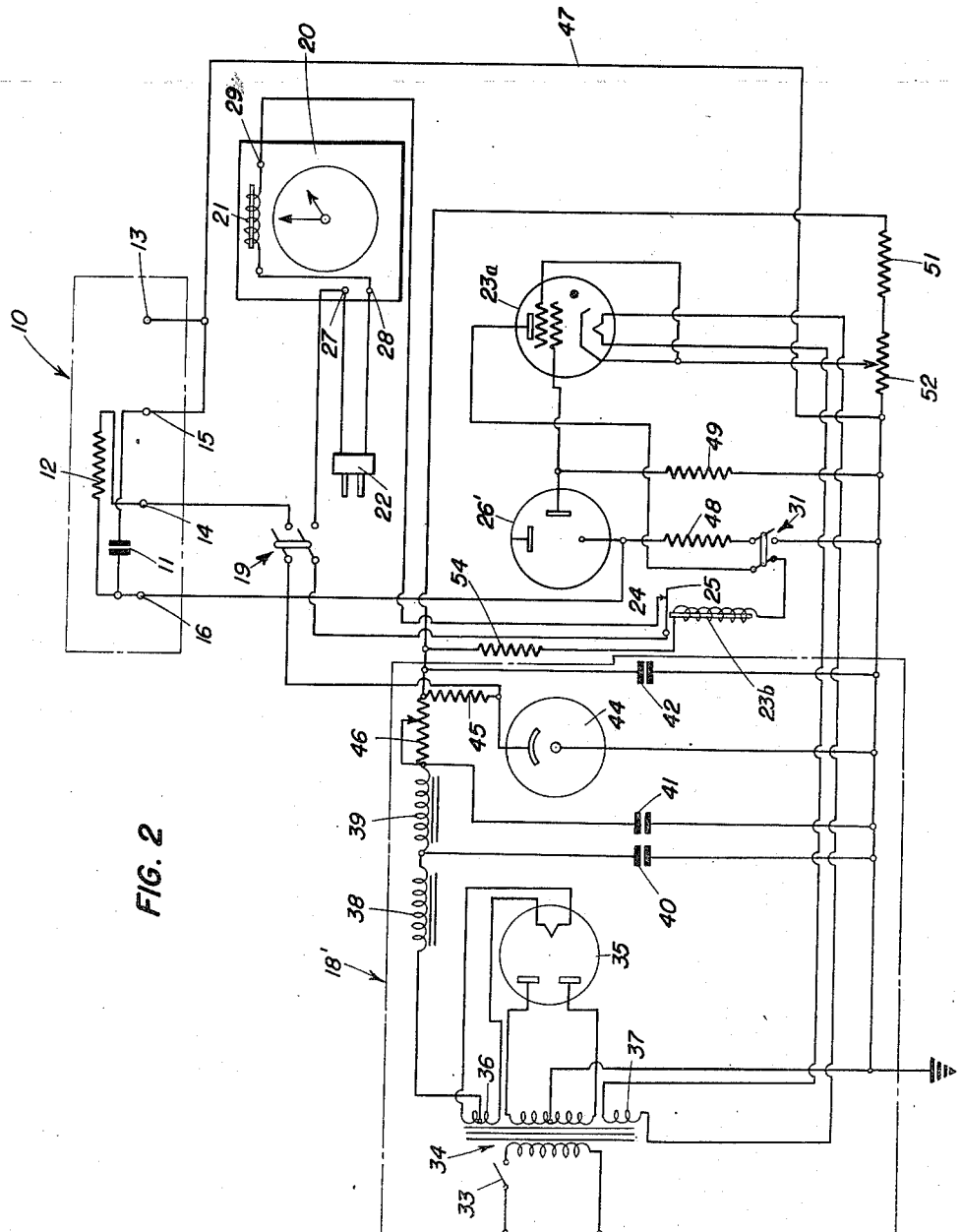

For a better understanding of the present invention, together with other and further objects thereof, reference is made to the following specification and claims and to the accompanying drawings in which:

Fig. 1 is a block diagram of a testing device in accordance with the present invention; and Fig. 2 is a circuit schematic of a preferred embodiment of a testing device in accordance with the present invention.

The device symbolically represented in Fig. 1 is described in the light of the problem which is solved by the present invention. It facilitates production and laboratory tests of the performance of circuit arrangements of the type indicated generally at 10. Sample 10 includes a time-constant circuit comprising a capacitor 11 and a resistor 12, connected in series between terminals 14 and 15. Capacitor 11 is connected to terminals 15 and 16. Device 10 also has a grounded terminal 13. This testing device measures the time interval between the instant of application of a known electromotive force between terminals 14, 15 (and across the R-C circuit comprising elements 11, 12) and the instant of attainment of some predetermined magnitude by the voltage between terminals 15, 16 (and across condenser 11).

In order to apply a known voltage to the R-C circuit at a particular instant there is provided a potential source 18, the negative terminal of which is connected to terminals 15, and 13 and the positive terminal of which is connected to terminal 14 through a first blade and set of contacts of a double-pole, single-throw switch 19. For the purpose of measuring the desired time interval there is provided a clock 20. Unit 20 is a commercially available electrically-operated elapsed-interval timer having a magnetic clutch 21. The clutch is adapted to be energized to initiate operation of the clock and functions to stop the clock upon disconnection of the clutch coil from its source of excitation. Clock 20 is coupled to a 110 volt, 60 cycle, alternating current supply by a connector 22. When switch 19 is closed the coil of clutch 21 is excited by the 110 volt source through a circuit comprising a second blade and set of contacts of switch 19 and the normally closed contacts 24, 25 of a relay device 23. It will thus be seen that at the time of application of a potential across terminals 14, 15 by the closing of switch 19, the magnetic clutch is energized and clock 20 begins to run.

For the purpose of stopping the clock when the voltage across terminals 15, 16 has attained the predetermined magnitude, there is provided an arrangement for utilizing this voltage to open the contacts of relay device 23. This arrangement comprises a discharge device 26 having a breakdown characteristic and included in circuit between terminals 15, 16 and the input terminals of relay device 23. Upon attainment of the predetermined voltage magnitude, device 26 breaks down and there is applied to the input circuit of relay 23 substantially all of the potential across condenser 11. The relay is "tripped" and opens contacts 24, 25, disconnecting the coil of clutch 21 from its source of excitation and stopping the clock. Clock 20 measures the interval between the closing of switch 19 (time of application of electromotive force to the R-C circuit) and the attainment of the predetermined magnitude by the voltage across condenser 11 (and resultant opening of the contacts of relay 23).

There is represented schematically in Fig. 2 the specific circuit arrangement of a preferred form of the invention. Terminals 13, 14, 15 and 16, clock 20, and its terminals 27, 28 and 29 and other elements identical with those shown in Fig. 1 have the same reference numerals and similar elements have the same reference numerals primed.

In Fig. 2 a power supply 18' comprising conventional rectifying, filtering and voltage-regulating components is provided as a voltage source, a cold-cathode trigger tube 26' is provided as a discharge device, and the "relay" comprises a "Thyratron" tube 23a, and a standard single-pole relay 23b. Additionally, the Figure 2 embodiment includes a two-gang reset control switch 31 for opening the "Thyratron" plate circuit and discharging condenser 11 at the end of the time-interval measurement.

Power supply 18' comprises a conventional "on-off" switch 33 and a power transformer 34 coupled to the 110 volt source. Transformer 34 includes a high-voltage secondary coupled to the anodes of a full-wave rectifier tube 35 and having a grounded center tap. A secondary winding 36 furnishes filament current for tube 35 and a secondary winding 37 furnishes filament current for "Thyratron" 23a. The high-potential supply line is connected to a center tap on secondary 36. The filtering arrangement comprises series chokes 38, 39 and shunt condensers 40, 41 and 42. Unit 18′ also includes a voltage-regulating output circuit comprising a conventional voltage regulating tube 44 in series with a resistor 45 and a variable series resistor 46. Since it is desired to apply a known potential across terminals 14, 15 for charging the R-C circuit, terminal 14 is coupled to the anode of voltage regulating tube 44 though a first blade and set of contacts of switch 19 and terminal 15 is grounded by conductor 47.

Since it is necessary to employ the potential between terminals 15 and 16 to break down discharge device 26′ and to trip relay 23a, 23b, terminal 16 is connected to the cathode of tube 26′ to hold the cathode more positive than the starting anode. The main anode is not used. During the resetting operation the junction of the connections from terminal 16 and the cathode of tube 26′ is connected through a resistor 48 and a first set of contacts and blade of switch 31 to ground, so that condenser 11 discharges. During the measuring operation the potential between terminals 15 and 16 appears across resistor 48 and the high impedance of the cathode-starting anode circuit of tube 26′, effectively entirely across the latter by virtue of its high resistance.

Upon breakdown of tube 26′ substantially all of the last-mentioned potential appears across a resistor 49, connected between the starting anode of tube 26′ and ground, since the tube impedance decreases and the potential drop between the cathode and starter anode is then negligible. The potential appearing across resistor 49 is utilized to render a control electrode of tube 23a more positive. This electrode is normally biased negatively by unit 18′ through a circuit, comprising a series arrangement of resistor 51 and variable resistor 52, between the high voltage terminal of unit 18′ and ground. To this end, the cathode of tube 23a is connected to a desired point on resistor 52. The tap on resistor 52 and therefore the cathode of tube 23a are biased to be more positive than that terminal of resistor 49 remote from ground and therefore more positive than the control electrode of tube 23a.

Upon breakdown of tube 26′, the potential across resistor 49 overcomes this bias, since the junction of resistor 49 and the starter electrode of tube 26′ is connected to the control electrode of the "Thyratron" tube. Tube 23a is accordingly "triggered" and it becomes conductive. Tube 23a also includes a shielding electrode connected to its cathode.

The plate current flowing in tube 23a causes this sequence of events: (1) the winding of relay 23b is excited and contact 25 is separated from contact 24 and attracted to the magnetic core disposed within the relay winding; (2) the circuit between the 110 volt source and the magnetic clutch is broken; (3) the magnetic clutch is de-energized; and (4) clock 20 stops. In order to accomplish these objectives, the anode of tube 23a is connected, through a second set of contacts and blade of switch 31, the winding of relay 23b and a dropping resistor 54, to the high-potential side of power supply 18′. The tube discharge path is completed by connecting the cathode of tube 23a to ground, through a portion of resistor 52, and thus to the ground side of unit 18′.

After a measurement has been taken it is desired to set up the device for another operation. This requires the discharge of condenser 11 and the stopping of anode current in tube 23a. Accordingly, there is provided a resistor 48 in a series circuit comprising terminal 16, the first-mentioned blade and set of contacts of switch 31 and ground. During the measurement operation this circuit is open and the second set of switch 31 contacts (in series with relay 23b) is initially closed. However, when the resetting operation is performed, the latter set of contacts is opened and the first set of contacts (in series with resistor 48) is closed. Since terminals 15 and 16 are then effectively short-circuited by resistor 48, condenser 11 discharges. Moreover, the plate circuit of tube 23a is then open and anode-current flow ceases.

While it is not proposed that the invention be limited to any specific circuit dimensions, the following component characteristics have been found practicable in one successful embodiment of the type illustrated in Fig. 2.

| Component | Characteristic |
| --- | --- |
| Input voltage to unit 18′ | 110 volts, alternating current, 60 cycles per second. |
| Tube 35 | 5W4. |
| Chokes 38 and 39 | 15 henries. |
| Condensers 40, 41 and 42 | 8 microfarads. |
| Tube 26′ | Type OA4-G. |
| Tube 23a | Type 2051. |
| Resistor 54 | 25,000 ohms. |
| Resistor 48 | 2,000 ohms. |
| Resistor 49 | 20,000 ohms. |
| Resistor 52 | 5,000 ohms. |
| Resistor 51 | 200,000 ohms. |
| Resistor 46 | 10,000 ohms. |
| Resistor 45 | 10,000 ohms. |
| Supply voltage to clock | 110 volts alternating current 60 cycles per second. |
| Switch 19 | Two-gang. |
| Switch 31 | Do. |
| Tube 44 | Type 874 or Type VR90. |

Referring now to the operation of the device illustrated in Fig. 2, it will be assumed that contacts 24 and 25 are in circuit, that relay 23b is deenergized, that switch 19 is open, that switch 31 is in the measuring position, that resistor 48 is out of circuit, that the testing device is suitably connected to the sample 10 to be tested, and that tube 23a is biased to a nonconductive state by the flow of current from unit 18′ through resistor 52. Since switch 19 is open magnetic clutch 21 is not excited and clock 20 is stopped.

Upon the closing of switch 19 an electromotive force is applied between terminals 14 and 15 and condenser 11 begins to charge. Simultaneously the magnetic clutch is energized and clock 20 begins to run. Upon the attainment of the predetermined magnitude of potential across condenser 11, the voltage between terminals 15 and 16 is sufficient to break down tube 26′ and substantially the whole of that voltage appears across resistor 49, rendering the control electrode of tube 23a more positive. The later tube is accordingly "tripped" and anode current flows therein, energizing the winding of relay 23b and breaking the circuit between contacts 24 and 25. Accordingly, the magnetic clutch winding is open-circuited and clock 20 stops. This occurs at the same instant as the attainment of the aforementioned predetermined potential across condenser 11. Therefore, clock 20 effectively measures the time of charge of condenser 11.

While there have been shown and described what are at present considered to be the preferred embodiments of the present invention, it will be obvious to those skilled in the art that various modifications and changes may be made therein without departing from the true spirit of the invention. For example a neon lamp with the starting resistor removed may be substituted for the cold-cathode tube 26'. It is accordingly intended in the appended claims to cover all such changes and modifications as fall within the true scope of the invention and without the prior art.

I claim:

1. A testing device for measuring the time of charging of a capacitor through a resistance to a predetermined potential comprising a timer having an electrically operated control element adapted to start the timer when energized and to stop the timer when de-energized, means for simultaneously applying electric potentials to the control element to start the timer and to the capacitor under test through the resistor under test to begin charging said capacitor, and means to de-energize said control element to disable said timer including a gas-filled electron tube coupled to the capacitor under test and adapted to break down when said capacitor is charged to said predetermined potential, and also including means responsive to the breakdown to open the circuit to said control element, whereby said timer measures the time for charging said capacitor through said resistance to said predetermined potential.

2. A testing device in accordance with claim 1 in which the timer includes a drive mechanism and an indicating mechanism, and the electrically operated clutch element consists of a magnetic clutch for connecting said mechanisms.

3. A testing device in accordance with claim 1 and in which the means to open the circuit to said control element includes a relay.

4. A testing device in accordance with claim 1 and in which the means to open the circuit to said control element comprises a relay and a second gas-filled tube for actuating the relay.

5. A testing device for measuring the time of charging of a capacitor through a resistance to a predetermined potential, comprising a timer having an electrically operated control element adapted to start the timer when energized and to stop the timer when de-energized, means for simultaneously applying electric potentials to the control element to start the timer and to the capacitor under test through the resistor under test to begin charging said capacitor, an impedance coupled to said capacitor and including the interelectrode breakdown path through a glow discharge tube in which the impedance of said breakdown path decreases abruptly when the voltage across said capacitor reaches said predetermined potential, and means triggered by said decrease in impedance to open the circuit to said control element, whereby said timer measures the time for charging said capacitor through said resistance to said predetermined potential.

6. A testing device for measuring the time of charging of a capacitor through a resistance to a predetermined potential, comprising a timer having an electrically operated control element adapted to start the timer when energized and to stop the timer when de-energized, means for simultaneously applying electric potentials to the control element to start the timer and to the capacitor under test through the resistor under test to begin charging said capacitor, an impedance coupled to said capacitor and including the cathode-starter electrode breakdown a path of a cold-cathode electron tube which will break down when the voltage across said capacitor reaches said predetermined potential, a gas-filled, grid-controlled electron tube coupled to a portion of said impedance and adapted to be triggered by the potential appearing in said portion upon breakdown of said path, and a relay coupled to said grid-controlled tube and responsive to the discharge current thereof to open the circuit to said control element, whereby said timer measures the time for charging said capacitor through said resistance to said predetermined potential.

FRANK H. JACKSON.

REFERENCES CITED

The following references are of record in the file of this patent:

UNITED STATES PATENTS

| Number | Name | Date |
|---|---|---|
| 1,332,844 | Kasson | Mar. 2, 1920 |
| 2,010,968 | Smith | Aug. 12, 1935 |
| 2,044,424 | Edwards et al. | June 16, 1936 |
| 2,212,981 | Dorsett et al. | Aug. 27, 1940 |
| 2,408,727 | Blitz | Oct. 8, 1946 |
| 2,504,848 | Kunz | Apr. 18, 1950 |

FOREIGN PATENTS

| Number | Country | Date |
|---|---|---|
| 551,910 | Great Britain | Mar. 15, 1943 |